Aug. 12, 1958  F. S. SLICK  2,847,524
MAGNETO BREAKER MECHANISM
Filed June 7, 1954  4 Sheets-Sheet 1

Inventor
FRED S. SLICK
By
AGENT

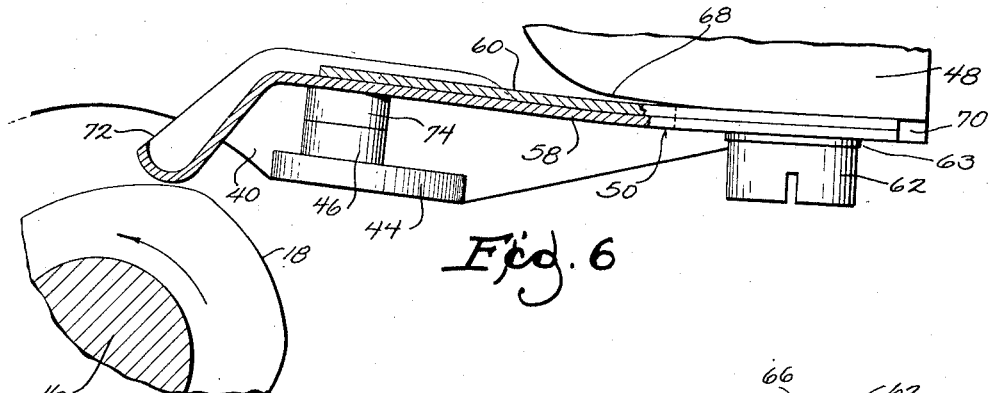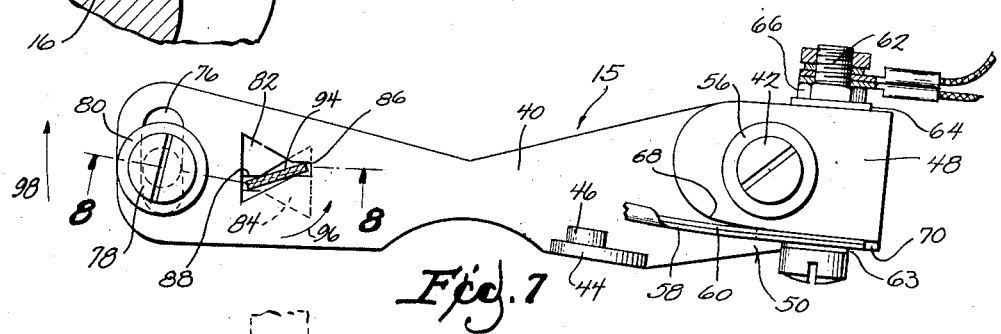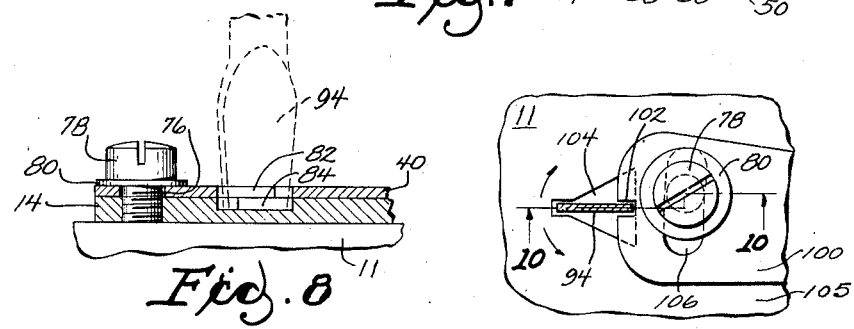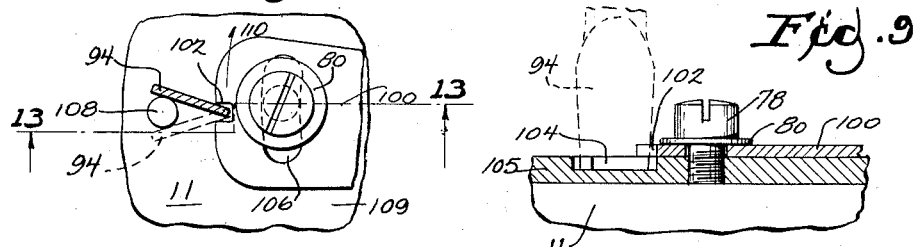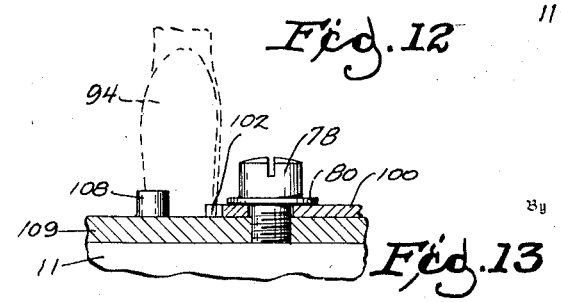

Aug. 12, 1958  F. S. SLICK  2,847,524
MAGNETO BREAKER MECHANISM
Filed June 7, 1954  4 Sheets-Sheet 3

Inventor
FRED S. SLICK
AGENT

Aug. 12, 1958  F. S. SLICK  2,847,524
MAGNETO BREAKER MECHANISM
Filed June 7, 1954  4 Sheets-Sheet 4

INVENTOR
FRED S. SLICK
ATTORNEY

United States Patent Office 2,847,524
Patented Aug. 12, 1958

2,847,524

MAGNETO BREAKER MECHANISM

Fred S. Slick, Rockford, Ill., assignor to J. I. Case Company, Racine, Wis., a corporation of Wisconsin Application June 7, 1954, Serial No. 434,903

1 Claim. (Cl. 200—30)

This invention relates to magnetos for producing the spark in connection with internal combustion engines and especially to an improved breaker bar construction.

An object of this invention is to provide a breaker bar which does not have a conventional pivot pin about which to oscillate.

Another object is to provide a breaker bar which has no lost motion to interfere with proper functioning of the contact points.

Another object is to provide a breaker bar which will not rock, thus prolonging the life of the contact points by preventing injurious arcing.

Another object of this invention is to provide a breaker bar which has the contact point positioned at a point intermediate the fulcrum shoe and the means of fastening the fixed end of the bar.

Another object is to provide a breaker bar which is lighter than conventional breaker bars, thereby permitting greater speeds without impairing the function.

Another object of this invention is to furnish a means of damping the "bounce" of the breaker bar and thus further prolong the life of the contact points.

Another object is to furnish an improved and economical means of adjusting the gap between the contact points in a very simple manner by merely modifying two presently-existing elements of the magneto.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

This application is a continuation in part of the application of Slick, Serial No. 232,619, filed June 20, 1951, and a further object is to provide a new construction of cam for a breaker bar of the improved type, which cam will result in a substantially lengthened period of operation as compared to heretofore known arrangements, before adjustment or replacement is necessary.

More particularly it relates to an arrangement in which the cam may be substantially smaller in relation to the shaft which carries it, than cams heretofore known, the resulting low peripheral speed reducing the rate of wear to a valve approximately equivalent to the normal rate of burning away of the points, so that the amount of opening of the latter remains substantially constant throughout an unusually long period of use.

Another object is to provide a cam of such a contour that wear has little or no effect on the instant in the rotation thereof at which the points are opened and the spark occurs. In other words the timing remains substantially constant regardless of wear.

Another object is to provide an improved bearing arrangement for a distributor rotor.

Referring to the drawings,

Fig. 6 is an enlarged view of a portion of Fig. 2 showing the breaker bar and damping spring with parts broken away;

Fig. 7 is an enlarged view of a portion of Fig. 2 with parts broken away, showing the means of adjusting for proper contact point operation;

Fig. 8 is a horizontal section taken at 8—8 of Fig. 7;

Fig. 9 is an elevation of a modification of an adjusting means similar to that shown in Figs. 7 and 8;

Fig. 10 is a horizontal section at 10—10 of Fig. 9;

Fig. 12 is an elevation of another means of adjusting the contact point constituting a modification of the invention;

Fig. 13 is a horizontal section taken at 13—13 of Fig. 12;

Considerable difficulty is often experienced with conventional breaker bars. This difficulty arises primarily because of wear in the pivot means which usually is of the pin-and-bushing type. This type of pivot is subject to excessive freedom or play between parts which freedom increases as wear takes place.

Excessive play allows erratic functioning of the breaker bar which takes the form of "bouncing" at high speed resulting in excessive burning of the contact points, and making frequent servicing necessary.

Excessive wear in the breaker bar pivot also allows the bar to rock, which is an additional cause of burned contacts. This invention eliminates all play by use of a resilient fastening means, thus avoiding all objections to the conventional pin-and-bushing type of pivoting.

The tendency to "bounce" is further reduced owing to the snubbing action resulting when the resilient fastening of this invention is employed.

The placing of the contact points intermediately between the anchored end of the breaker bar and the cam shoe thereof permits a finer adjustment of the gap when the points separate, and a heavy pressure at the points with a relatively light pressure between the cam and the breaker bar.

The breaker bar of the present invention is substantially lighter than conventional bars in that no bushing, spring, or other auxiliary parts are attached thereto with the exception of the contact point, thus reducing the inertia and a corresponding tendency to "bounce."

The means of adjusting the gap between the contact points embraced by this invention is an improvement over the conventional eccentric-screw type. It requires the use of no tool other than a screw driver which tool is also employed to fix the adjustment after the latter has been made. The adjusting means requires merely the modification of the two conventional, relatively moving members and no additional parts. The adjusting means has no elements subject to wear which would require subsequent replacement, and no parts to become lost.

Figure 1:
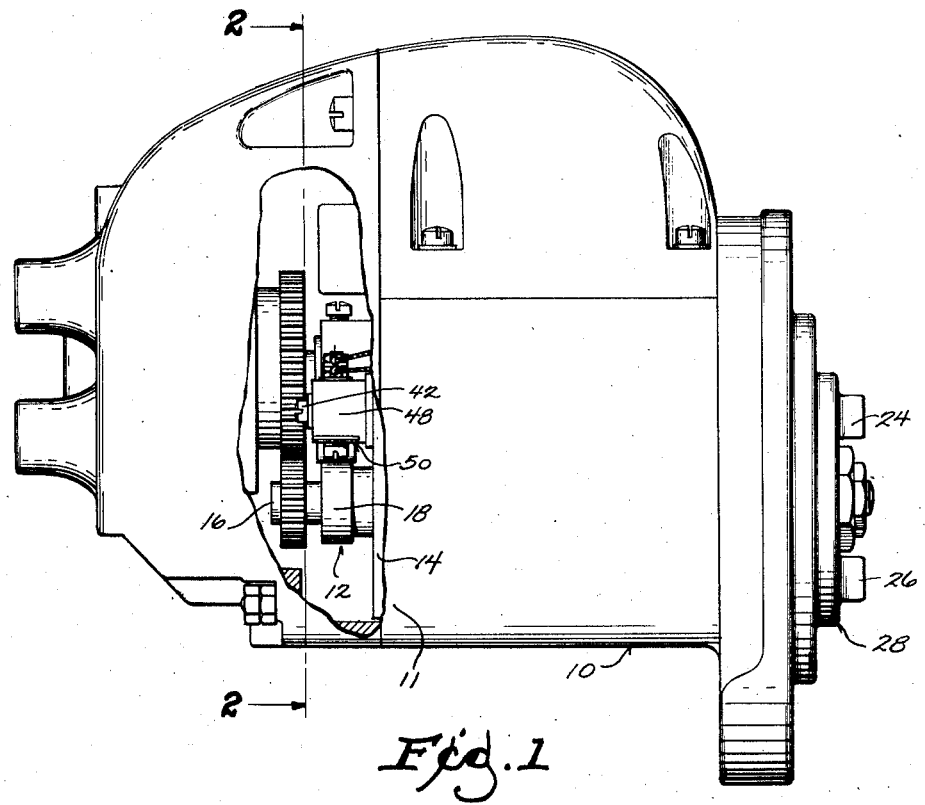
Figure 1 shows a side elevation, in normal upright position, of a typical magneto to which this invention is adapted, a portion being broken away to show the invention.

This invention is embodied in a standard magneto 10, having a frame 11, and of the type used on internal combustion engines. Referring to Fig. 1, the breaker assembly is indicated at 12, the magneto cap being broken out to show the mechanism. The magneto, being conventional, will not be further described except when necessary to explain the invention clearly.

The breaker assembly 12 comprises a base plate 14 which is secured to frame 11 and supports the breaker bar assembly 15, which is a self-contained unitary assembly. An armature shaft 16 extends forwardly through base plate 14 and has keyed or otherwise fixed thereto a cam 18. In this instance the cam 18 being for use with a four-cylinder engine is provided with two lobes 20 and 22. Shaft 16 is rotated by a suitable coupling means not shown and which is driven in synchronizm with the engine in well-known manner, and which coupling engages lugs 24 and 26 of the usual impulse coupling 28 which in turn is keyed to the armature shaft 16. Base plate 14 is secured to the frame 11 of the magneto by means of screws 32, 34, 36 and 38.

Figure 2:
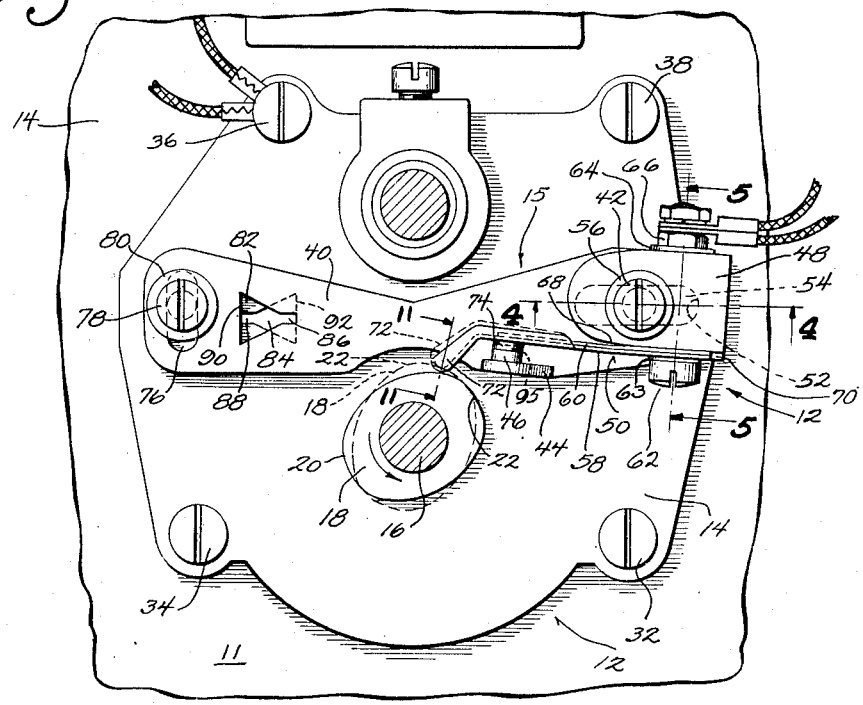
Fig. 2 shows a vertical section taken at 2—2 of Fig. 1.

The breaker bar assembly includes a support plate 40 which rests against base plate 14, as shown in Fig. 2.

Support plate 40 is pivoted about the axis of a screw 42 and carries an upturned arm 44 which is preferably an integral part of the support plate 40 and moves with the latter. A fixed contact point 46 is riveted, welded, or otherwise secured to the upper portion of arm 44, and is of the conventional type not necessary to further describe.

A breaker-arm support block 48 forms the mounting means for a breaker bar unit 50. The breaker arm support block 48 is made of a non-conducting material such as Bakelite, formica, or any of the well-known insulating materials which are capable of being molded. Support plate 40 is provided with an elongated aperture 52, Figs. 2, 4, and 5 which conforms to an extension 54 forming part of support block 48. Aperture 52 and extension 54 cooperate and form an interlocking connection to prevent relative rotation of plate 40 and breaker arm support 48.

Figures 4, 14:
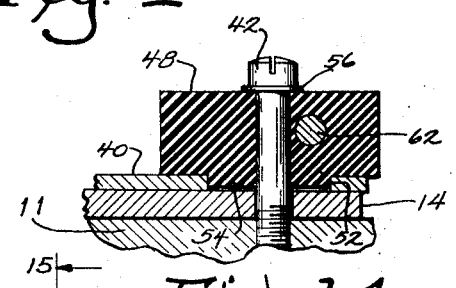
Fig. 4 shows a section at 4—4 of Fig. 2.
Fig. 14 is an elevation of a further modification of the adjusting means.

Screw 42 passes through a hole in breaker arm support 48 and is threaded into base plate 14, as shown in Fig. 4, or can be threaded into frame 11. A washer 56 is assembled with screw 42 to prevent the head of the latter from scoring the breaker arm support surface, and to also obtain a smoother action when adjusting the gap between the contact points.

Breaker bar unit 50 comprises a resilient cantilever breaker bar 58 and a cantilever spring 60. Bar 58 and spring 60 are positioned, as shown in Fig. 2, and are provided with aligned holes, and a bolt 62 is passed therethrough. Bolt 62 is also passed through a hole in support 48 and a washer 64 and nut 66 completes the assembly by securing the breaker bar 58 against the support.

Support 48 is provided with a curved end as at 68 primarily to assure that breaker bar 58 and spring 60 are flexed uniformly and at an arc which will not tend to injure the structure of these members by abruptly bending them as they are vibrated by the action of cam 18.

Figure 3:
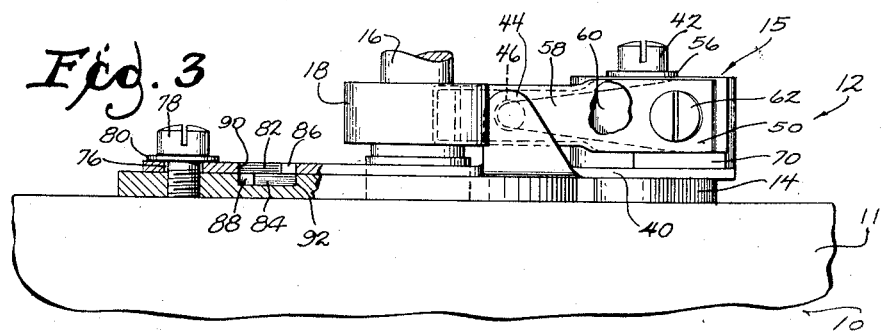
Fig. 3 is a bottom plan view of the portion of a magneto shown in Fig. 2.
Figure 11:
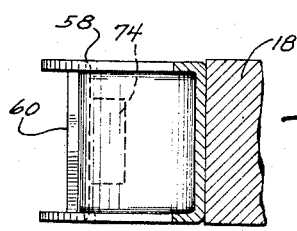
Fig. 11 is a vertical section at 11—11 of Fig. 2.
Figure 5:
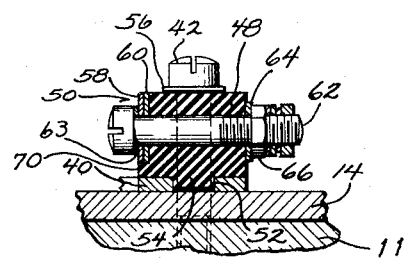
Fig. 5 is a vertical sectional view taken at 5—5 of Fig. 2.
Figure 15:
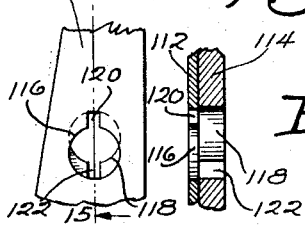
Fig. 15 is a sectional view thereof on the line 15—15 of Fig. 14.

Support 48 is provided with an alignment lug 70, Figs. 3 and 5, against which breaker bar 58 and spring 60 abut. The function of lug 70 is to prevent the rotation of bar 58 and spring 60 about screw 62 and thereby maintain the bar 58 in proper relationship with respect to the cam 18.

Breaker bar 58 is of a flexible material such as steel, relatively thin and formed as shown in Figs. 2, 3, 5, 6, and 11. Bar 58 comprises a shoe portion 72, Figs. 2 and 6, of channel section and which rides on cam 18. The channel section extends approximately one-half the length of the bar 58, and supplies the required stiffness to maintain proper contact operation; the remainder of bar 58 being of a flat section to permit flexure. Breaker bar 58 is hardened and tempered in order to provide the necessary permanent resiliency. A moving contact point 74 is fixed in a suitable manner to breaker bar 58 at a point intermediate bolt 62 and shoe 72. Contact point 74 is positioned so as to be co-axial with contact point 46 when they are in contact. Another function of lug 70 is to maintain the co-axial relationship between contact points 46 and 74, it being found that the slightest variation in the relation of the moving contact to the stationary contact from time to time, will cause unnecessary wear or burning of the contacts.

Spring 60 is of a shape shown in Fig. 3 and terminates approximately at contact 74. Spring 60 is of spring steel and of the proper flexibility to prevent "bouncing" of bar 58 and to absorb some of the force imparted to the breaker bar 58 by the cam 18, it being noted that bending of breaker bar 58 and spring 60 together by reason of actuation by cam 18, will cause at least a small amount of sliding movement between the two as is common in multiple interleaved springs of much larger size, in vehicles for example, and inherent in springs of this nature. Such friction, as is well known, tends to damp out resonant vibrations.

Support plate 40 is provided with means at a point remote from screw 42, for locking the support 40 after obtaining the desired gap 95 between contact points 46 and 74 when cam 18 has raised shoe 72 the maximum distance as shown by dotted lines in Fig. 2. It should be understood that, regardless of the gap desired, contact points 46 and 74 must make contact with each other when cam 18 has been rotated to a point where the latter does not contact shoe 72. Means for so adjusting the parts comprises an elongated slot 76 in plate 40 having a contour formed by arcs having as centers the axis of screw 42. A screw 78 is provided which passes through slot 76 and is threaded into plate 14, as shown in Fig. 3. A washer 80 is placed under the head of screw 78 to facilitate adjustments.

A feature of this invention resides in the novel means of shifting plate 40 for adjusting the gap between the contact points 46 and 74, by merely using a screw driver. The preferred form of this means is shown in Figs. 2, 3, 7 and 8, and comprises an aperture 82 and an underlying recess 84. Aperture 82 is provided in support plate 40, and recess 84 is provided in plate 14. It will be noticed that aperture 82 and recess 84 are identical in configuration but are rotated 180 degrees relative to each other, as shown in Fig. 2, whereby similar elements of aperture 82 and recess 84 are opposed to each other. Aperture 82 has a narrow slot 86 and recess 84 has a similar slot 88. The ends 90 and 92 are merely provided as necessary clearance for the rotation of the adjusting tool which will be described later. Slots 86 and 88 are disposed on a line passing through the axis of screw 42.

The method of adjusting the gap between the contact points 46 and 74 will now be described by reference to Figs. 2, 7 and 8. The tool used in this instance is a screw driver 94, of the conventional type and being of a thickness to allow turning the necessary angle and of a blade width sufficient to substantially engage the slots 86 and 88 simultaneously.

When an adjustment is to be made, screws 42 and 78 are loosened slightly so that support plate 40 can move about the axis of screw 42 and shaft 16 is turned so that shoe 72 rests on a high lobe 20 or 22 of cam 18 so as to cause a separation or gap 95 indicated in dotted lines in Fig. 2. A screw driver 94 is then inserted into apertures 82 and 84, as shown in Figs. 7 and 8. It will be clear that, since slot 88 in plate 14 cannot move, a rotation of screw driver 94 about its axis, in the direction of the arrow 96, will effect a shifting of support plate 40 about the axis of screw 42, in the direction of arrow 98 of Fig. 7, thus reducing the size of gap 95. To obtain an adjustment in the opposite direction the screw driver is rotated in the direction opposite to that indicated by the arrow 96 of Fig. 7. When the desired adjustment has been obtained screws 42 and 78 are securely tightened to preserve the setting.

From this description it will be clear that the adjustment described is convenient and effective in that the only tool required to perform the complete operation is an ordinary screw driver.

Fig. 9 is a modification showing an alternative adjusting means. In this variation the support 100 is provided with a notch 102 of similar proportions to that indicated as 86 in Fig. 2. A recess 104 is provided in a plate 105 as shown in Figs. 9 and 10. This recess is of a similar contour to recess 84 of Figs. 2 and 7, and similarly placed relative to notch 102. Support 100 is provided with an elongated slot 106 similar to that indicated at 76 in Figs. 2 and 7, and screw 78 and washer 80 provide the means of fixing the adjustment as described previously.

When making an adjustment in connection with the modification shown in Figs. 9 and 10, the same procedure is followed as with the arrangement shown in Figs. 6 and 7. The arrangement shown in Figs. 9 and 10 is simple, in that an open notch is formed in the support 100 in place of the aperture 82 as shown in Fig. 7, thus making for an economical construction.

Another modification of the adjusting means is shown in Figs. 12 and 13. In this arrangement the support 100 is retained as shown in Fig. 9. The primary difference between this modification and that shown in Figs. 9 and 10 is that a cylindrical post 108 is provided which is an integral part of a plate 109 and is positioned adjacent notch 102 so that post 108 can provide the fulcrum for the screw driver 94.

When making an adjustment with the arrangement shown in Figs. 12 and 13, the screw driver 94 is placed as shown on either side of post 108 and engaged slot 102, depending upon the direction of the adjustment desired. In Fig. 12 screw driver 94 is positioned so as to move the support 100 in the direction of arrow 110, by turning the screw driver about its axis.

Another modfication is shown in Fig. 14 in which a support 112 and a plate 114 are provided with cylindrical apertures 116 and 118, which are provided with notches 120 and 122 in mutually opposed relation. It will be noticed that aperture 118 passes completely through plate 114 which arrangement can be employed where the exclusion of dust is not vital. The manner of adjusting support 112 relative to plate 114 is identical to that previously described as shown in Fig. 7.

Figure 16:
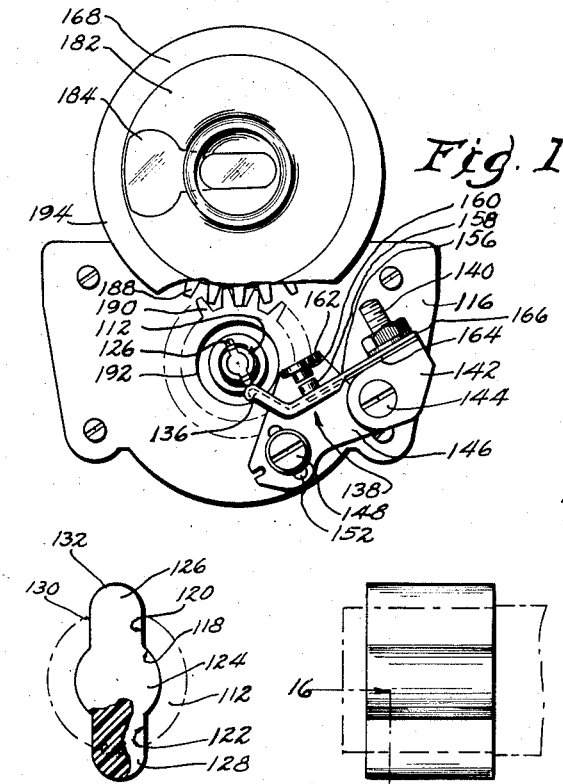
Fig. 16 is an end elevation of portions of a modified magneto showing the frame, breaker bar assembly reduction gears and distributor rotor, the other parts being omitted for clarity and as forming no part of the invention.

Fig. 16 shows a somewhat similar arrangement to the breaker mechanism hereinbefore disclosed but modified in certain respects. In this embodiment the magneto has a shaft 112 (see also Fig. 17) extending from an enlarged portion 114 carried in suitable or well-known bearing means, not shown, in an end plate or frame 116, in this case the shaft having an axial bore 118 more particularly indicated in Fig. 18 and being slotted at 120 and at 122. Within bore 118 is enclosed a cam body 124 having generally diametrically projecting lobes 126 and 128, each of said lobes having a relatively flat surface 130 and being rounded at 132 at its outer extremity. In this way, a two-lobe cam is provided which has an outer diameter only slightly larger than shaft 112, since its minimum diameter is not outside but is inside of the shaft. A snap ring of well-known form 134 is engaged in a suitable groove in shaft 112 so that cam body 124 cannot escape from bore 118. Cam lobes 126 and 128 encounter an outwardly open channel-shaped shoe portion 136 in the present instance formed as an integral part of a resilient breaker arm generally designated as 138 clamped as by a bolt 140 against an insulating block or member 142 pivoted on a screw, or the like 144, to frame 116. Block 142 is keyed or otherwise nonrotatably fixed in relation to a support 146 also swingable about screw 144 and which may be clamped by a screw 148 in relation to a boss 150 on frame 116, support 146 being slotted at 152 to provide for swinging adjustment about screw 144. As will be apparent, tightening of screws 148 and 144 will lock support 146 and block 142 in position; screw 144 engages a boss 154 best seen in Fig. 17.

Breaker arm 138 continues as an outwardly open channel from shoe 136 in a direction away from cam lobes 126 and 128 at a slight angle thereto (when the lobes are in contact with the shoe) and then bends to a direction substantially at right angles or at a much greater angle to the cam lobes to its position clamped against block 142. At a slight distance, sufficient to give flexibility, from block 142 indicated at 156, the outwardly open channel becomes a flat portion and about midway between said point 156 and the change in direction of the channel portion, a movable contact point 158 is fixed on arm 138. Adjacent thereto a stationary contact point on 160 is supported on a bracket 162 formed as a part of support 146. A damping spring 164 is clamped between arm 138 and block 142 and bears against the arm within the channel portion so as to assist the arm in springing against cam lobes 126 and 128 and in closing contact points 158 and 160. Since the flattened portion 166 of arm 138 and spring 164 flex about different points in the manner of multiple leaf springs, there is a sliding or rubbing action between two elements, the arm 138 and spring 164, most noticeable at the outer or free end of spring 164 and which frictional resistance tends to damp out any vibrations of arm 138, such as bouncing action, harmonic vibration, periodic distortion of the arm and the like, so that arm 138 follows the contour of the cam lobes in a highly accurate manner, and contacts 158 and 160 close in exactly the same relation every time after each actuation. This is extremely important, as it has been found that the slightest variation in this contacting relation will cause burning away of the contacts at any rate many times more rapid than what is necessary, if the contacts close in an accurate manner. It has been observed that a breaker bar of this type with the damping spring has run as long as 5,000 hours (and some specimens as long as 10,000 hours) without any adjustment and without sufficient variation in timing to have any effect on engine efficiency. Cam body 142 and lobes 126 and 128 are preferably made of insulating material, such as hard rubber, or one of the well-known plastics, so that breaker arm 138 may be a single integral metallic unit without short-circuiting the primary electric current through the cam. It is preferably a stamping of hard steel and consequently, any wear which takes place will be on the cam and not on the arm, and it is possible to so regulate the rate of wear by suitably governing the spring pressure and area of contact that the cam will wear at a rate substantially equivalent to the normal burning of the contacts. The proper gap having been determined, it will remain the same for unprecedently long periods because of this compensatory action.

Magneto rotors commonly run at crankshaft speed, whereas the cycle of firing of the engine cylinders is at one-half that speed. Magnetos are therefore provided with switching or so-called distributor rotors which are geared to run at one-half the speed of the magneto shaft. Other ratios are possible but 2 to 1 is common. The present invention lends itself to advantageous construction of this part of the magneto. In the disclosed embodiment a large gear, 168, in the present instance made of a hardened plastic material, such for example as nylon has an integral shank 170 journaled in a bushing 172 supported in a portion of frame 116. In the present instance, shank 170 is somewhat longer than the depth of the bushing and bears at 174 on the end portion 176 thereof. A cavity 178 is provided which may be packed with a suitable lubricating grease sufficient to keep the surfaces lubricated for long periods. The relation of the parts provides a slight clearance at 180 between the body of gear 168 and bushing 172. A switching plate 182 of strongly insulating material in the present instance is inlaid in gear 168 and carries a metal switching segment 184 of conventional or well-known form on which the usual brushes, not shown, may slide and contact from time to time. A rim 186 integral with switching plate 182 surrounds the usual primary or feeder brush to prevent flashing over the spark to nearby parts of the magneto.

Gear 168 has teeth 188 which mesh with teeth 190 of a gear 192 slidable and rotatable on shaft 112. Gear 168 has a rim 194 which tends to unite and strengthen teeth 188 and increases the distance which a stray spark would have to travel from segment 184 to reach a metallic part of the magneto.

Figure 17:
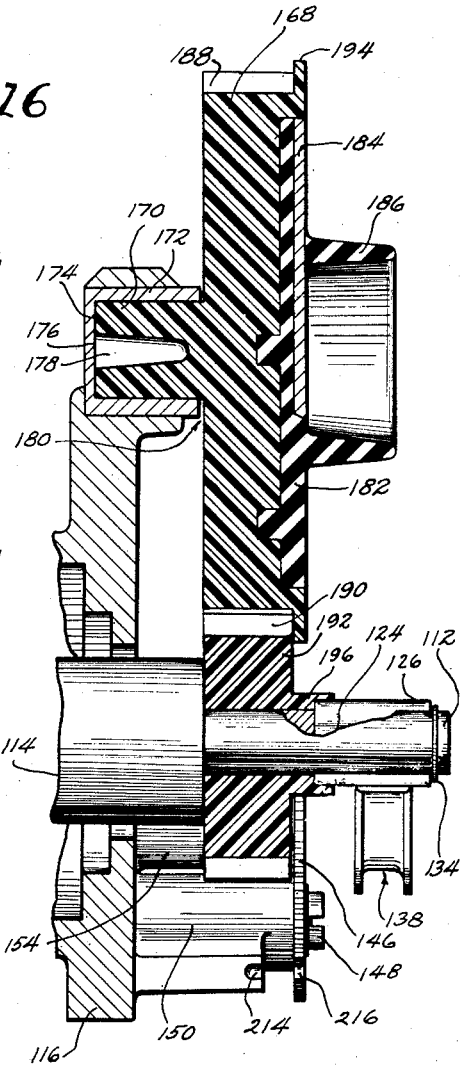
Fig. 17 is a vertical axial section of the structure of Fig. 16, as seen from the left, enlarged, and with parts in a slightly different position, and others broken away.
Figure 18:
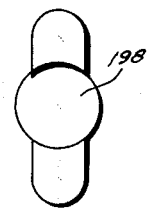
Fig. 18 is an end elevation of a cam shown in Fig. 16, enlarged.
Figure 19:
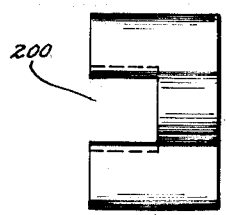
Fig. 19 is a side elevation of the same.

Gear 192 has a projecting hub 196 provided with opposed recesses substantially complimentary to lobes 126 and 128 of cam 124, said lobes, projecting from shaft 112 engaging said recesses as best seen in Fig. 17. In this manner, gear 192 is keyed on shaft 112, cam 124 serving the dual purpose of actuating breaker arm 138 and securing gear 192 in proper relation to shaft 112.

Snap ring 134 secures both cam 124 and gear 192 against escape from shaft 112.

Figures 20, 21:
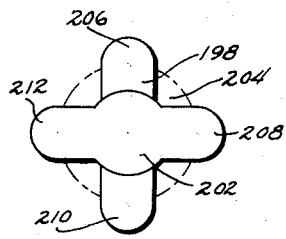
Fig. 20 is an end elevation of a modified type of cam.
Fig. 21 is a side elevation of the same.
Figures 22, 23:
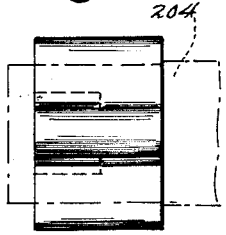
Fig. 22 is an end elevation of an assembly of two of the elements shown in Fig. 21.
Fig. 23 is a side elevation of the same.

In certain types of ignition apparatus, for example, although not exclusively in the case of battery type distributors, the shaft runs at cam shaft speed, and it is desirable to have a four-lobe cam. In this instance, a cam 198, Figs. 20 and 21, identical with above described cam 124 has a portion cut out at 200, complementary to above-mentioned cam body 124. Two such cams, 198 previously mentioned, and 202, Figs. 22 and 23, may be placed together in reversed relation as particularly shown in Fig. 23 and placed in suitably cut-away portions of a shaft 204; whereupon, a cam is provided having four lobes, 206, 208, 210, and 212. The action of such a cam with a breaker arm, identical to arm 138 or previously described arm 153, will be clear from this description, sufficient to say that if four breaks per revolution are required the advantages of the present cam may be realized in this manner.

To facilitate adjustment of support 146, boss 150 is formed with a groove 214 on a projecting portion thereof, and a matching groove 216 is provided in support 146. A tool, such as a screw driver, may be inserted in both grooves at once and, when turned or rocked about groove 214 as a fulcrum, will shift support 146 in very small implements as described.

The operation is throught to be clear from the above description, but it might be observed that the cam bodies as 124 are readily formed from a long strip of suitable material which may be purchased, accurately formed as to its outside contours, short sections being cut off to form the individual cam bodies. Dimensions are readily held to close tolerances in material of this kind, so that extreme accuracy is possible by merely carefully forming shaft 112, a simple machining operation. The nylon gears 168 and 192 may be run for long periods without lubrication (except for shank 170) so that there is little chance of getting oil on the contacts 158 and 160—a known reason for premature failure. When it is necessary to adjust the gap between contacts 158 and 160, a simple implement, such as a screw driver, may be inserted in grooves 214 and 216, after loosening screws 144 and 148; whereupon, support 146 may be moved up or down as little as necessary to obtain the correct clearance. Tightening screws 144 and 148 will maintain the adjustment.

The above being a complete description of an illustrative embodiment of the invention, what is claimed as new and desired to be secured by Letters Patent of the United States is:

In an ignition system of the type having a rotatable shaft, the improvement which comprises a cam body within the shaft and having a lobe projecting through and beyond the side thereof, a gear on the shaft, being provided with a recess substantially complementary to said cam lobe and within which a portion of said cam lobe is axially disposed for keying said first-mentioned gear to rotate with said shaft.

References Cited in the file of this patent
UNITED STATES PATENTS

| | | |
|---|---|---|
| Re. 16,313 | Kent | Apr. 6, 1926 |
| 995,697 | Marr | June 20, 1911 |
| 1,050,799 | Briggs | Jan. 21, 1913 |
| 1,161,434 | Baier | Nov. 23, 1915 |
| 1,320,871 | Krauss | Nov. 4, 1919 |
| 1,581,186 | Elverson | Apr. 20, 1926 |
| 1,632,167 | Bradford | June 14, 1927 |
| 1,670,440 | Dorsey | May 22, 1928 |
| 2,010,957 | Mack | Aug. 13, 1935 |
| 2,030,488 | Williams | Feb. 11, 1936 |
| 2,073,782 | Cole et al. | Mar. 16, 1937 |
| 2,240,804 | Schwarzmann | May 6, 1941 |
| 2,275,890 | Coe | Mar. 10, 1942 |
| 2,348,896 | Gibson et al. | May 16, 1944 |
| 2,487,231 | Fitzsimmons | Nov. 8, 1949 |
| 2,508,486 | Berlyn et al. | May 23, 1950 |
| 2,519,976 | Phelon | Aug. 22, 1950 |
| 2,542,411 | Henschke | Feb. 20, 1951 |